United States Patent [19]

Anupam et al.

[11] Patent Number: 5,991,796

[45] Date of Patent: Nov. 23, 1999

[54] TECHNIQUE FOR OBTAINING AND EXCHANGING INFORMATION ON WORLD WIDE WEB

[75] Inventors: Vinod Anupam, Scotch Plains; Narain H. Gehani, Summit; Kenneth R. Rodemann, Bridgewater, all of N.J.

[73] Assignee: Lucent Technologies Inc., Murray Hill, N.J.

[21] Appl. No.: 09/133,716

[22] Filed: Aug. 13, 1998

Related U.S. Application Data

[63] Continuation of application No. 08/683,072, Jul. 16, 1996, Pat. No. 5,862,330.

[51] Int. Cl.$^6$ .................................................. G06F 17/00
[52] U.S. Cl. .................................................................. 709/206
[58] Field of Search ........................ 395/200.32, 200.34, 395/200.47, 330, 331, 332, 712, 651; 707/501, 514; 709/205, 206, 217

[56] References Cited

U.S. PATENT DOCUMENTS

| | | |
|---|---|---|
| 5,206,934 | 4/1993 | Naef, III . |
| 5,537,548 | 7/1996 | Fin et al. . |
| 5,572,643 | 11/1996 | Judson . |
| 5,592,478 | 1/1997 | Weiss . |
| 5,649,105 | 7/1997 | Aldred et al. . |
| 5,652,866 | 7/1997 | Aldred et al. . |
| 5,862,330 | 1/1999 | Anupam .............................. 395/200.34 |

OTHER PUBLICATIONS

"Shared Mosaic," http://www.eit.com/goodies/software/share_mosaic/sh-mosaic.html, Ver.2.pre2, p. 1.
"Usage for Shared Mosaic," http://www.eit.com/goodies/software/share_mosaic/shared-mosaic-usage.html, p.1.
"Shared Mosaic Features," http://www.eit.com/goodies/software/share_mosaic/shared-mosaic-features.html, Ver.2.pre2, p. 1.
"Shared Mosaic Todo List," http://www.eit.com/goodies/software/share_mosaic/shared-mosaic-todo.html, Ver.2.pre2, p. 1.
"Look@Me A Timbuktu Applet with Netscape Plug-in," http://collaborate.farallon.com/www/look/ldownload.html, pp. 1 & 2.
"EMSL Collaborative Research Environment (CORE)," http://www.emsl.pnl.gov:2080/docs/tour/index.html, pp. 1 & 2.

*Primary Examiner*—Ellis B. Ramirez

[57] ABSTRACT

Computer users may utilize different web browsers to access a server system on the World Wide Web (WWW) to create or join a collaborative browsing session. The users or collaborators in a session are connected by one or more controllers in the server system. When a collaborator creates or joins a session, mobile code is transmitted from the system to the collaborator's computer to create a surrogate thereon, which monitors the collaborator's interaction with a web browser on the computer. The controllers communicate with all the surrogates of the collaborators to coordinate the collaborative browsing effort. When one of the surrogates detects a change by a collaborator of a uniform resource locator (URL), the new URL is communicated through the controllers to the surrogates of all other collaborators in the session. As such, the collaborators are able to move from one URL to another to browse information in a synchronous manner. In addition, the collaborators can interactively communicate with one another in real time through the respective surrogates during the session.

95 Claims, 4 Drawing Sheets

TECHNIQUE FOR OBTAINING AND EXCHANGING INFORMATION ON WORLD WIDE WEB

This application is a continuation of application Ser. No. 08/683,072, filed on Jul. 16, 1996 now U.S. Pat. No. 5,802,330.

FIELD OF THE INVENTION

The invention relates to systems and methods for providing communications between users over a computer network, and in particular to systems and methods for providing collaborative browsing of information and interactive communications on the World Wide Web (WWW) or the "web".

BACKGROUND OF THE INVENTION

Computer users can access many resources on an expansive international network of computer networks known as the Internet. WWW is a graphical subnetwork of the Internet. With common "web browser" software of the type of NETSCAPE browser, the users can readily access Internet information or services provided by web servers on WWW.

Many Internet services allow communications between users. For example, two or more computer users may access a designated web server providing a "text-chat" service, whereby users may interactively communicate in text with one another in real time.

Computer users can also share web browsing experiences using a SHARED MOSAIC browser. To that end, each user is required to have his/her own copy of the SHARED MOSAIC software on a computer. To establish links between a user and his/her companions, the user needs to communicate to the companions beforehand by, say, email or telephone an internet protocol (IP) port number identifying the user's particular browser. The companions then run the respective browsers on their computers and enter the IP port number as communicated, thereby establishing the links between the user's computer and the companions' computers through the Internet. As the user is visiting a website of interest, he/she can select an option provided by the browser to share with the companions the same information from the website through the established links.

SUMMARY OF THE INVENTION

While the SHARED MOSAIC type arrangement is desirable in that a user and his/her companions can share the same web information in real time, an aspect of its application has been recognized by us to be disadvantageous. In particular, each of the user and companions need to have the same specialized browser software (e.g., the SHARED MOSAIC browser) in order to take advantage of the prior art arrangement, despite the fact that a variety of more popular browsers are being used.

The present invention, however, solves the above-identified problem. In accordance with the invention, when each user wants to partake a collaborative web browsing session, the user accesses a system which transmits mobile code to the user's computer to create a surrogate thereon. The surrogates created for the users in the same session are connected by at least one controller in the system, and the surrogates serve as an interface between the controller and the respective browsers on the users' computers, which browsers may be different from one another. When a user in the session changes the website address with a browser, the surrogate associated therewith obtains the new address and transmits it to other surrogates in the same session through the controller. Each other surrogate then directs its respective browser to change the web address accordingly. As such, the users in a session manage to move from one web site to another in a synchronous manner, and share information in real time.

BRIEF DESCRIPTION OF THE DRAWING

The present invention will be more fully appreciated by consideration of the following detailed description, when read in light of the accompanying drawing in which.

DETAILED DESCRIPTION

Figure 1:
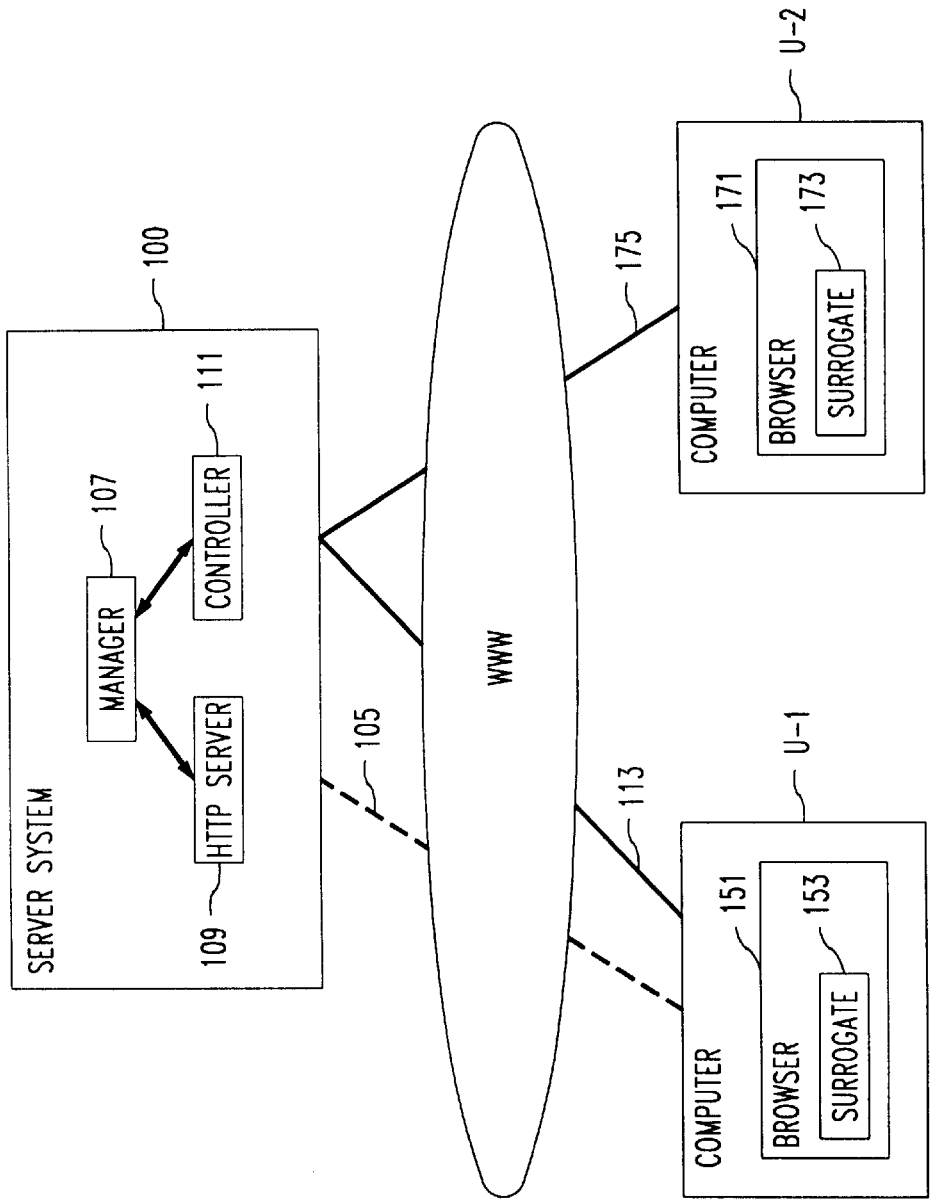
FIG. 1 is a block diagram of a server system for obtaining and exchanging information over WWW in accordance with the invention.

FIG. 1 illustrates server system 100 embodying the principles of the invention, which is connected to the World Wide Web (WWW) as a web server. Advantageously, system 100 works compatibly with standard web browsers such as the NETSCAPE browser, the standard hypertext transfer protocol (HTTP) and hypertext markup language (HTML). Among other things, system 100 provides users with services of (a) collaborative browsing of HTML documents at various websites on WWW, and (b) real-time interactive communications between the users, in accordance with the invention. Specifically, with system 100, during a collaborative browsing session, multiple users or collaborators are allowed to synchronously and cooperatively browse information from websites addressable by their uniform resource locators (URLs). The collaborators may also interact with one another through text-chat communications for example. In addition, system 100 allows users to freely join and exit an on-going session and is capable of scaling its capacity to accommodate a changing number of sessions and collaborators in a particular session.

As shown in FIG. 1, a user may utilize computer U-1 to access system 100 over WWW at a predetermined URL. Computer U-1 may be a conventional personal computer (PC) running standard web browser 151 such as the NETSCAPE browser. As soon as U-1 is connected to system 100 through link 105, manager 107 in system 100 starts communicating with U-1 through web browser 151 and HTTP server 109 having a common gate interface (CGI).

Figure 2A:
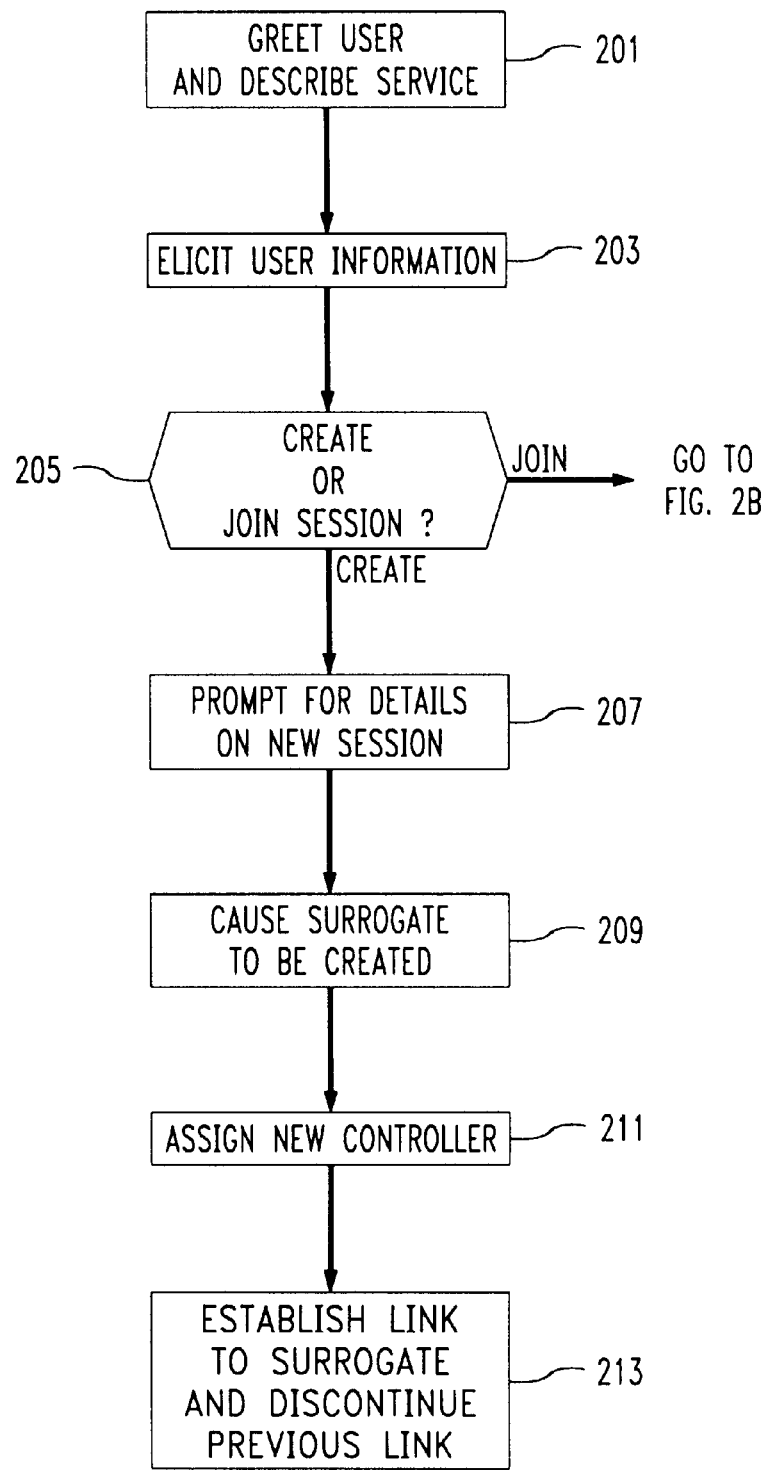
FIGS. 2A and 2B are flow charts jointly depicting the steps in carrying out the operation of the system of FIG. 1.
Figure 2B:
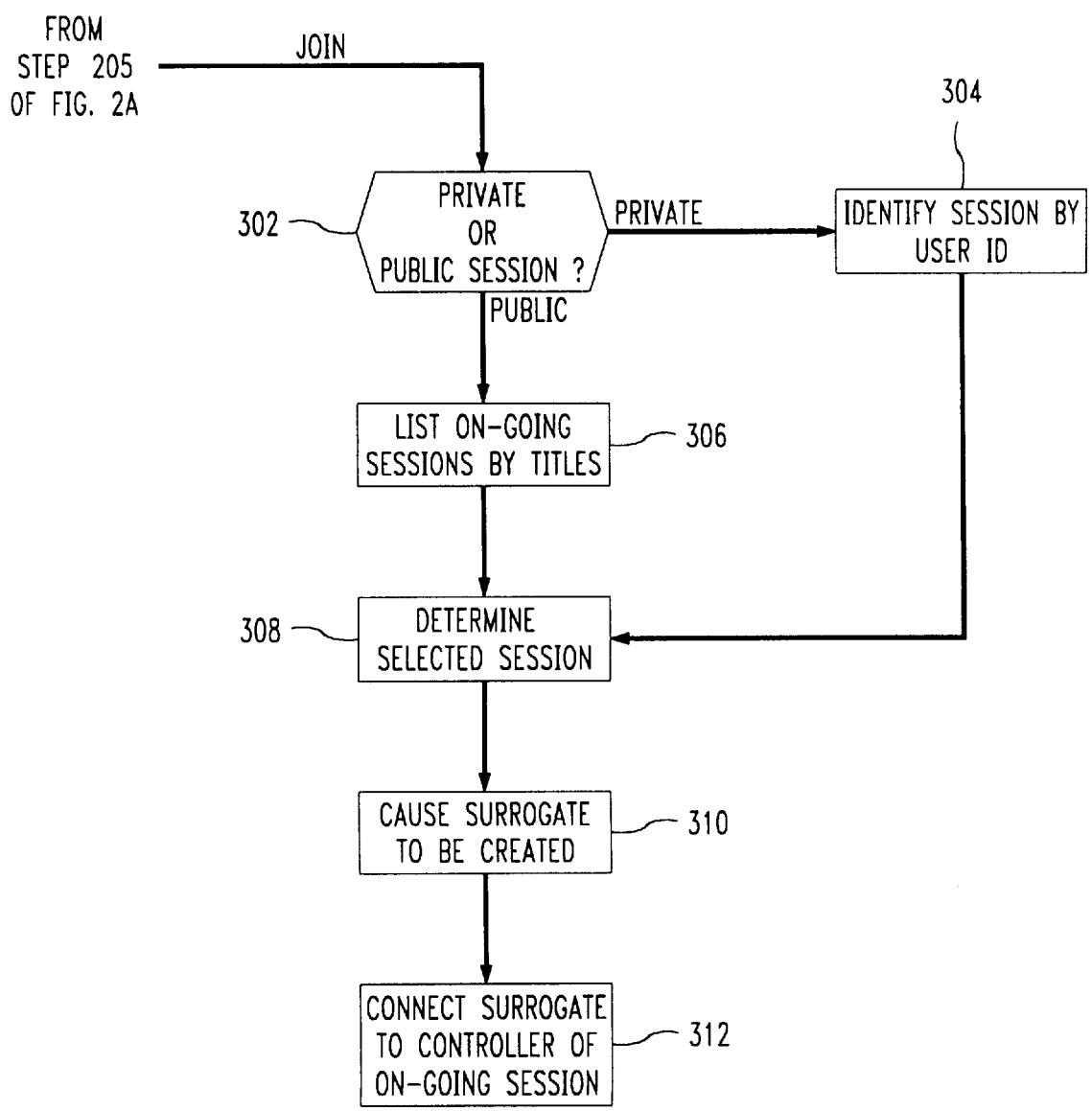

Manager 107 comprises a service routine for helping a user to establish a collaborative browsing session. FIG. 2 illustrates the steps of the service routine in accordance with the invention. At step 201, manager 107 causes a "home page" to be displayed on U-1, which greets the user, and describes the service provided by system 100. Manager 107 then elicits from U-1 of user information, as indicated at step 203. This information includes a user identification (ID), password and other administrative data necessary for ensuring that the user is an authorized user. At step 205, manager 107 inquires U-1 as to whether the user wants to create a session, or join an on-going session. In this instance, the user of U-1 chooses to create a session. Manager 107 at step 207 then prompts the user for the details on the session to be created, such as the purpose or the topic of the session, and whether it is a private or public session. By way of example, if it is a private session, a would-be collaborator must identify the user by his/her user ID who created the session in order to join it. If it is a public session, the topic of the session will be listed and is searchable by a would-be collaborator.

In this instance, the user of U-1 replies that the session to be created is public and the purpose of the session is to shop for an automobile. Manager 107 proceeds to start the new session and causes surrogate 153 to be created within browser 151 in computer U-1, as indicated at step 209. To that end, system 100 transmits to computer U-1 mobile code pursuant to a mobile programming language such as the standard JAVA language. Thus, in this instance, the mobile code may be in the form of a JAVA applet. Surrogate 153 is realized when the applet starts to run within browser 151 as soon as it reaches computer U-1. Surrogate 153 is further described hereinbelow, and it suffices to know for now that it serves as an assistance to the browser to carry out the session.

Since in this instance it is a new session, manager 107 at step 211 assigns a new controller, numerically denoted 111, to control and regulate the session. Manager 107 at step 213 causes controller 111 to be connected to surrogate 153 through link 113, and at the same time discontinues link 105.

Surrogate 153 serves as an interface between browser 151 and controller 111. Among other things, surrogate 153 monitors user interaction with the browser, and reports the user interaction to controller 111.

It should be noted at this point that surrogate 153 is realized using a JAVA applet which is transmitted to and executed on U-1 on an on-demand basis, no software needs to be installed or maintained on the user computer beforehand as in the traditional applications. Thus, any standard JAVA-enabled browsers such as the NETSCAPE browser can be utilized to implement the invention. In other words, system 100 does not require the users to have specialized browser software to take advantage of the inventive service.

After the new session starts, the user of computer U-1 may change the URL with browser 151 to one of an automobile website or any other website to obtain information about different car models and their specifications. The new URL is transmitted by surrogate 153 to controller 111 where the new URL is recorded and conveyed to the surrogates of other collaborators, if any, in the same session. At the same time, browser 151 access the web server at the new URL, and opens on computer U-1 an HTML document provided by the web server.

A second user may utilize computer U-2 to access system 100 at the predetermined URL to join an on-going session. After computer U-2 establishes a link (not shown) to HTTP server 109, manager 107 similarly goes through steps 201 and 203 of FIG. 2 previously described. However, at step 205, the user of U-2 in this instance chooses to join an on-going session. As such, manager 107 queries U-2 as to whether the second user wants to join a private session or public session, as indicated at step 302 in FIG. 2B. In this instance, the second user chooses to join a public session, and manager 107 proceeds to step 306. Otherwise, the second user needs to identify the private session to be joined by the user ID of the creator of that session, as indicated at step 304.

In any event, at step 306, manager 107 causes a list of all the on-going sessions to be displayed on computer U-2 including the automobile shopping session created by the user of computer U-1. Manager 107 then proceeds to step 308 where it determines the particular session selected by the second user. In this example, the second user chooses to join the automobile shopping session by pointing and clicking using a mouse device at the listed topic. At step 310, surrogate 173 is created on computer U-2, in a manner described before, within browser 171 which may be different from browser 151, in accordance with the invention. Once surrogate 173 is created, knowing that the automobile shopping session was assigned to controller 111, manager 107 causes controller 111 to be connected to surrogate 170 through link 175, as indicated at step 312.

At that point, a message is sent by controller 111 to each collaborator's computer connected thereto about the presence of a new collaborator. The user of U-2 is then afforded a chance to visit the sequence of URLs that the session has gone through to review its history. This sequence of URLs have been recorded and are updated in controller 111 as the session progresses. The user of U-2 is also afforded an option to browse new HTML documents synchronously with other collaborators. When that option is exercised, controller 111 sends the current URL to surrogate 173. The latter then directs web browser 171 to open the HTML document at the current URL.

During the automobile shopping session, when browser 151 initiates a change in the URL, the new URL information is obtained by surrogate 153, and the latter communicates this information to the surrogates of all other collaborators via controller 111. Each surrogate then directs its respective browser to open the HTML document at the new URL. As such, the collaborators manage to synchronously move from one URL to another to browse documents as the session progresses.

In this particular embodiment, the creator of the session is afforded the same capabilities as the other collaborators, except that the creator has the control of leading the session. In addition, the surrogates connected to controller 111 are programmed to allow the collaborators to interactively communicate in text with one another in real time. The collaborators may point and click at a specified icon on their computers using a mouse device to make the text-chat connections for exchanging their opinions on automobiles as the HTML documents unfold before them. However, it will be appreciated that a person skilled in the art may program controller 111 to enforce certain access control. For example, different collaborators may be afforded by controller 111 different capabilities during a collaborative session. Controller 111 may also enforce a priority scheme whereby the collaborators take turns leading the session and communications with one another.

Figure 3:
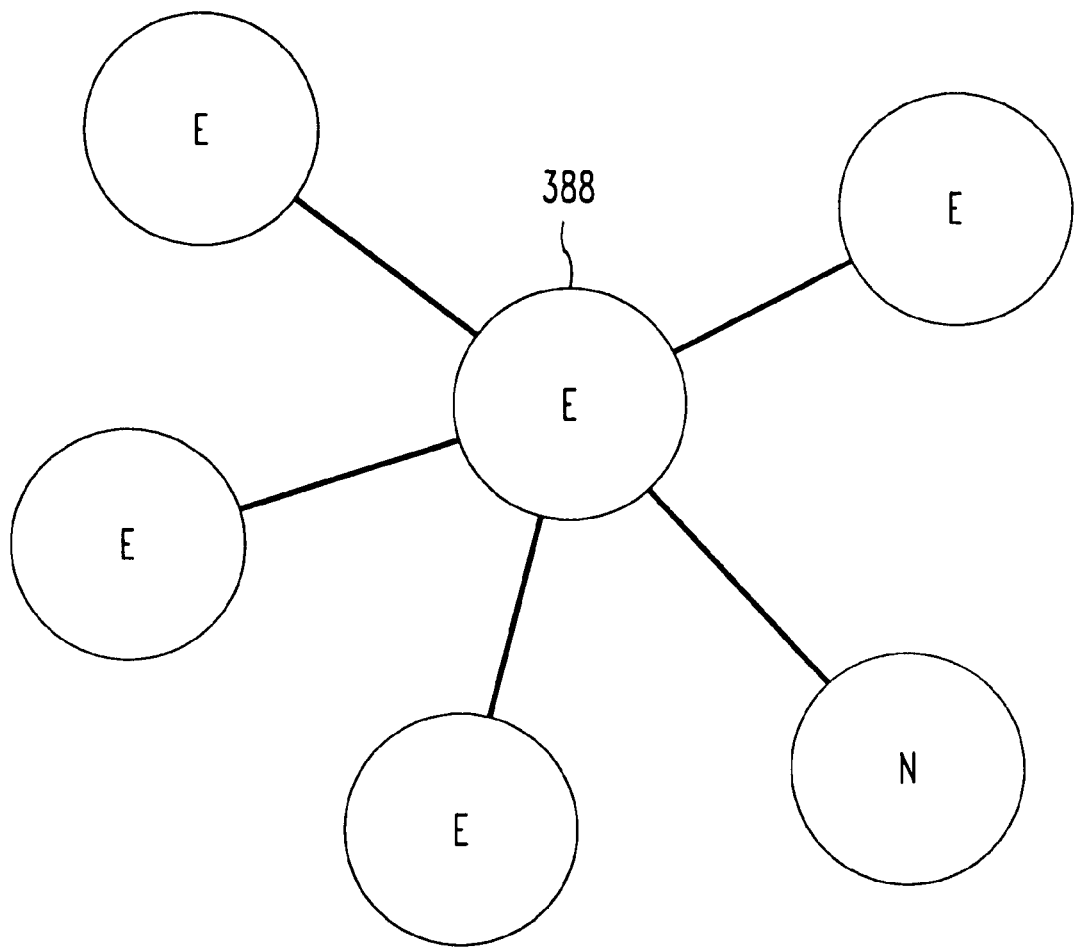
FIG. 3 illustrates an hierarchy of multiple controllers in the system of FIG. 1.

Other computer users who want to either create a session or join an on-going session go through the similar process to that of U-1 or U-2 described above. However, a controller may be overloaded at certain point as more and more collaborators joining a particular session regulated by the controller. Because of the server-based architecture of system 100 where intelligence and information on every user's connection resides in manager 107, the system capacity is readily scalable to accommodate a growing number of the collaborators, without affecting the service quality. Once the number reaches a predetermined threshold at a controller, manager 107 employs a new controller to connect the excessive collaborators. The new controller and existing controllers for the same session dynamically reorganize themselves in a hierarchy to facilitate communications with one another and their coordination to carry out the session in a synchronous manner. FIG. 3 illustrate one such hierarchy where the existing controllers (denoted by circles marked "E") and the new controller (denoted by a circle marked "N") form a star topology. In this hierarchy, controller 388 acts as an information center and efficiently distributes information from a controller to all other controllers.

Furthermore, as more and more controllers are engaged, the initial capacity of system 100 may run out. Again, because of the inventive architecture of system 100, a new controller may be engaged using additional hardware which can be easily absorbed into system 100.

Similarly, when the number of sessions exceeds a predetermined threshold, multiple managers similar to manager 107 are instituted and the managers are dynamically reorganized in a hierarchy similar to that of FIG. 3.

The foregoing merely illustrates the principles of the invention. It will thus be appreciated that a person skilled in the art will be able to devise numerous other systems which embody the principles of the invention and are thus within its spirit and scope.

For example, in the disclosed embodiment, a text-chat communications capability between the collaborators is provided through the cooperation of the surrogates. Other means of communications can also be provided, in addition to or in lieu of the "text chat" communications, using the surrogates. These other communications means include standard telephone, internet phone, packet phone and video conferencing facilities.

More important, system 100 is extremely advantageous to the service industry where, for example, service representatives attempt to sell products, or to resolve bill problems with customers. In the sales situation, a service representative (e.g., using U-1) and customer (e.g., using U-2) may access system 100 to partake a session where they collaboratively access one or more pertinent product databases (e.g., websites) over a computer network (e.g., WWW) and interactively communicate with each other in real time to consummate a sale. In the bill problem situation, a service representative and customer can partake a session where they can take turns referring to one or more pertinent databases and interactively communicating with each other in real time to resolve a bill problem.

Moreover, in the disclosed collaborative session, the surrogate associated with a browser initiating a change in the URL sends the new URL information to other collaborators' surrogates via a controller. Each other surrogate then directs its web browser to open the HTML document at the new URL. As an alternative, instead of sharing a URL, the collaborators may share the content of an HTML document. In this alternative approach, the surrogate obtains a copy of the HTML document at the new URL opened by the associated browser, and sends it through the controller to the other surrogates. The latter then direct their respective web browsers to display the received copy.

However, the aforementioned URL and content sharing approaches may give rise to different effects. With the URL sharing approach, heavy traffic may be generated at the new URL as each collaborator independently accesses the URL to retrieve the document. In fact, some collaborators may be able to access the document while others may be denied access because the web server is overloaded. With the content sharing approach, such an overload is averted by retrieving the document from the web server only once.

In addition, with the URL sharing approach, the collaborators may not see identical documents. For example, if the documents contain a field which records the number of times that the website has been visited, the documents seen by each collaborator are different at least in the number shown in that field. Thus, the URL sharing approach may be desirable in a situation where two collaborators should not be able to receive identical documents. For example, in resolving a bill problem, it is desirable to have the service representative in possession of more data than the customer. For instance, in addition to what is presented to a customer, the service representative may want to see from the document the customer's rating (a good customer or bad customer) which is confidential. With the content sharing approach, such data customization is not easily realizable while, with the URL sharing approach, this customization is relatively straightforward by assigning to the service representative a special user ID. Because of the special ID recognizable by the database, the latter transmits to the service representative and customer different versions of the document.

Finally, system 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus connected to at least one device through a communications network, the at least one device including a browser for obtaining information from the communications network, the apparatus comprising:

a processor for providing programming code to the at least one device to create a surrogate therein, the surrogate acquiring data from the browser; and a controller for receiving the data from the surrogate through the communications network.

2. The apparatus of claim 1 wherein the data includes second data provided by a user of the at least one device.

3. The apparatus of claim 1 wherein the data includes second data concerning a source providing the information.

4. The apparatus of claim 3 wherein the source includes a web server connected to a World Wide Web (WWW).

5. The apparatus of claim 1 wherein the programming code is devised in accordance with a mobile programming language.

6. The apparatus of claim 5 wherein the mobile programming language includes a JAVA language.

7. The apparatus of claim 6 wherein the programming code is in the form of a JAVA applet.

8. The apparatus of claim 1 wherein the processor includes the controller.

9. A server system for realizing communications between at least a first device and a second device through a communications network, the first device including a browser for obtaining information from the communications network, the server system comprising:

a processor for providing programming code to the first device to generate a surrogate therein, the surrogate obtaining first data from the browser; and a controller connected to the first device and the second device through the communications network, the controller receiving the first data from the surrogate and transmitting to the second device second data based on the first data.

10. The system of claim 9 wherein the communications concern the information from the communications network.

11. The system of claim 9 wherein the controller controls a flow of data from the second device to the first device.

12. The system of claim 9 wherein the controller selects one of the first device and the second device to lead the communications.

13. The system of claim 9 wherein the first data includes selected data provided by a user of the first device.

14. The system of claim 9 wherein the first data includes selected data concerning a source providing the information.

15. The system of claim 14 wherein the source includes a web server connected to a WWW.

16. The system of claim 14 wherein the programming code is devised in accordance with a mobile programming language.

17. The system of claim 16 wherein the mobile programming language includes a JAVA language.

18. The system of claim 17 wherein the programming code is in the form of a JAVA applet.

19. The system of claim 9 wherein the processor includes the controller.

20. A server system for admitting at least a first device and a second device into a session in which the first device is allowed to communicate with the second device, the first device including a browser for obtaining information from at least one source, the system comprising:
- a processor for providing programming code to the first device to generate a surrogate therein after the first device is admitted to the session, the surrogate obtaining first data from the browser; and
- a controller connected to the first device and the second device, the controller receiving the first data from the surrogate and, after the second device is admitted to the session, transmitting to the second device second data based on the first data.

21. The system of claim 20 wherein the session involves textual communications between the first device and the second device.

22. The system of claim 20 wherein the session involves audio communications between the first device and the second device.

23. The system of claim 20 wherein the session involves video communications between the first device and the second device.

24. The system of claim 20 wherein the source includes a web server connected to a WWW.

25. The system of claim 20 wherein the programming code is devised in accordance with a mobile programming language.

26. The system of claim 25 wherein the mobile programming language includes a JAVA language.

27. The system of claim 26 wherein the programming code is in the form of a JAVA applet.

28. The system of claim 20 wherein the processor includes the controller.

29. A server system for realizing communications between at least a first device and a second device through a communications network, the first device including browser means for obtaining information from the communications network, the server system comprising:
- means for establishing a first connection with the first device and a second connection with the second device through the communications network;
- means for providing programming code through the first connection to the first device to a generate a surrogate therein, the surrogate acquiring data from the browser means;
- means for receiving the data from the surrogate through the first connection; and
- means for transmitting second data based on the received data to the second device through the second connection.

30. The system of claim 29 wherein the programming code is devised in accordance with a mobile programming language.

31. The system of claim 30 wherein the mobile programming language includes a JAVA language.

32. The system of claim 31 wherein the programming code is in the form of a JAVA applet.

33. Apparatus for realizing a session in which the apparatus communicates with at least one device, the apparatus comprising:
- an interface for receiving programming code from a source external to the apparatus, and information from the at least one device; and
- a processor for generating a surrogate based on the programming code, the surrogate processing the information to realize the session.

34. The apparatus of claim 33 comprising a communications device.

35. The apparatus of claim 34 wherein the communications device includes a personal computer.

36. The apparatus of claim 33 wherein the processor includes a browser for creating the surrogate.

37. The apparatus of claim 33 wherein the session involves audio communications with the at least one device.

38. The apparatus of claim 33 wherein the session involves textual communications with the at least one device.

39. The apparatus of claim 33 wherein the session involves video communications with the at least one device.

40. The apparatus of claim 33 wherein the programming code is devised in accordance with a mobile programming language.

41. The apparatus of claim 40 wherein the mobile programming language includes a JAVA language.

42. The apparatus of claim 41 wherein the programming code is in the form of a JAVA applet.

43. The apparatus of claim 33 wherein the processor includes the interface.

44. Apparatus for realizing a session in which the apparatus communicates with at least one device, the apparatus comprising:
- an interface for receiving programming code from a source external to the apparatus; and
- a processor for generating a surrogate based on the programming code, the surrogate transmitting information to the at least one device to realize the session.

45. The apparatus of claim 44 comprising a communications device.

46. The apparatus of claim 45 wherein the communications device includes a personal computer.

47. The apparatus of claim 44 wherein the processor includes a browser for creating the surrogate.

48. The apparatus of claim 44 wherein the session involves audio communications with the at least one device.

49. The apparatus of claim 44 wherein the session involves textual communications with the at least one device.

50. The apparatus of claim 44 wherein the session involves video communications with the at least one device.

51. The apparatus of claim 44 wherein the programming code is devised in accordance with a mobile programming language.

52. The apparatus of claim 51 wherein the mobile programming language includes a JAVA language.

53. The apparatus of claim 52 wherein the programming code is in the form of a JAVA applet.

54. The apparatus of claim 44 wherein the processor includes the interface.

55. A method for use in an apparatus which is connected to at least one device through a communications network, the at least one device including a browser for obtaining information from the communications network, the method comprising:

providing programming code to the at least one device to create a surrogate therein;

acquiring, by the surrogate, data from the browser; and receiving the data from the surrogate through the communications network.

56. The method of claim 55 wherein the data includes second data provided by a user of the at least one device.

57. The method of claim 55 wherein the data includes second data concerning a source providing the information.

58. The method of claim 57 wherein the source includes a web server connected to a WWW.

59. The method of claim 55 wherein the programming code is devised in accordance with a mobile programming language.

60. The method of claim 59 wherein the mobile programming language includes a JAVA language.

61. The method of claim 60 wherein the programming code is in the form of a JAVA applet.

62. A method for realizing communications between at least a first device and a second device through a communications network, the first device including a browser for obtaining information from the communications network, the method comprising:

providing programming code to the first device to generate a surrogate therein;

obtaining, by the surrogate, first data from the browser;

receiving the first data from the surrogate; and transmitting to the second device second data based on the first data.

63. The method of claim 62 wherein the communications concern the information from the communications network.

64. The method of claim 62 further comprising controlling a flow of data from the second device to the first device.

65. The method of claim 62 further comprising selecting one of the first device and the second device to lead the communications.

66. The method of claim 62 wherein the first data includes selected data provided by a user of the first device.

67. The method of claim 62 wherein the first data includes selected data concerning a source providing the information.

68. The method of claim 62 wherein the programming code is devised in accordance with a mobile programming language.

69. The method of claim 68 wherein the mobile programming language includes a JAVA language.

70. The method of claim 69 wherein the programming code is in the form of a JAVA applet.

71. A method for use in a server system for admitting at least a first device and a second device into a session in which the first device is allowed to communicate with the second device, the first device including a browser for obtaining information from at least one source, the method comprising:

providing programming code to the first device to generate a surrogate therein after the first device is admitted to the session;

obtaining, by the surrogate, first data from the browser;

receiving the first data from the surrogate; and transmitting to the second device second data based on the first data after the second device is admitted to the session.

72. The method of claim 71 wherein the session involves textual communications between the first device and the second device.

73. The method of claim 71 wherein the session involves audio communications between the first device and the second device.

74. The method of claim 71 wherein the session involves video communications between the first device and the second device.

75. The method of claim 71 wherein the programming code is devised in accordance with a mobile programming language.

76. The method of claim 75 wherein the mobile programming language includes a JAVA language.

77. The method of claim 76 wherein the programming code is in the form of a JAVA applet.

78. A method for realizing communications between at least a first device and a second device through a communications network, the first device including browser means for obtaining information from the communications network, the method comprising:

establishing a first connection with the first device and a second connection with the second device through the communications network;

providing programming code through the first connection to the first device to a generate a surrogate therein;

acquiring, by the surrogate, data from the browser means;

receiving the data from the surrogate through the first connection; and transmitting second data based on the received data to the second device through the second connection.

79. The method of claim 78 wherein the programming code is devised in accordance with a mobile programming language.

80. The method of claim 79 wherein the mobile programming language includes a JAVA language.

81. The method of claim 80 wherein the programming code is in the form of a JAVA applet.

82. A method for use in an apparatus for realizing a session in which the apparatus communicates with at least one device, the method comprising:

receiving programming code from a source external to the apparatus, and information from the at least one device;

generating a surrogate based on the programming code; and processing, by the surrogate, the information to realize the session.

83. The method of claim 82 wherein the session involves audio communications with the at least one device.

84. The method of claim 82 wherein the session involves textual communications with the at least one device.

85. The method of claim 82 wherein the session involves video communications with the at least one device.

86. The method of claim 82 wherein the programming code is devised in accordance with a mobile programming language.

87. The method of claim 86 wherein the mobile programming language includes a JAVA language.

88. The method of claim 87 wherein the programming code is in the form of a JAVA applet.

89. A method for use in an apparatus for realizing a session in which the apparatus communicates with at least one device, the method comprising:

receiving programming code from a source external to the apparatus;

generating a surrogate based on the programming code; and transmitting, by the surrogate, information to the at least one device to realize the session.

90. The method of claim 89 wherein the session involves audio communications with the at least one device.

91. The method of claim 89 wherein the session involves textual communications with the at least one device.

92. The method of claim 89 wherein the session involves video communications with the at least one device.

93. The method of claim 89 wherein the programming code is devised in accordance with a mobile programming language.

94. The method of claim 93 wherein the mobile programming language includes a JAVA language.

95. The method of claim 94 wherein the programming code is in the form of a JAVA applet.

* * * * *